३,०५८,८७१

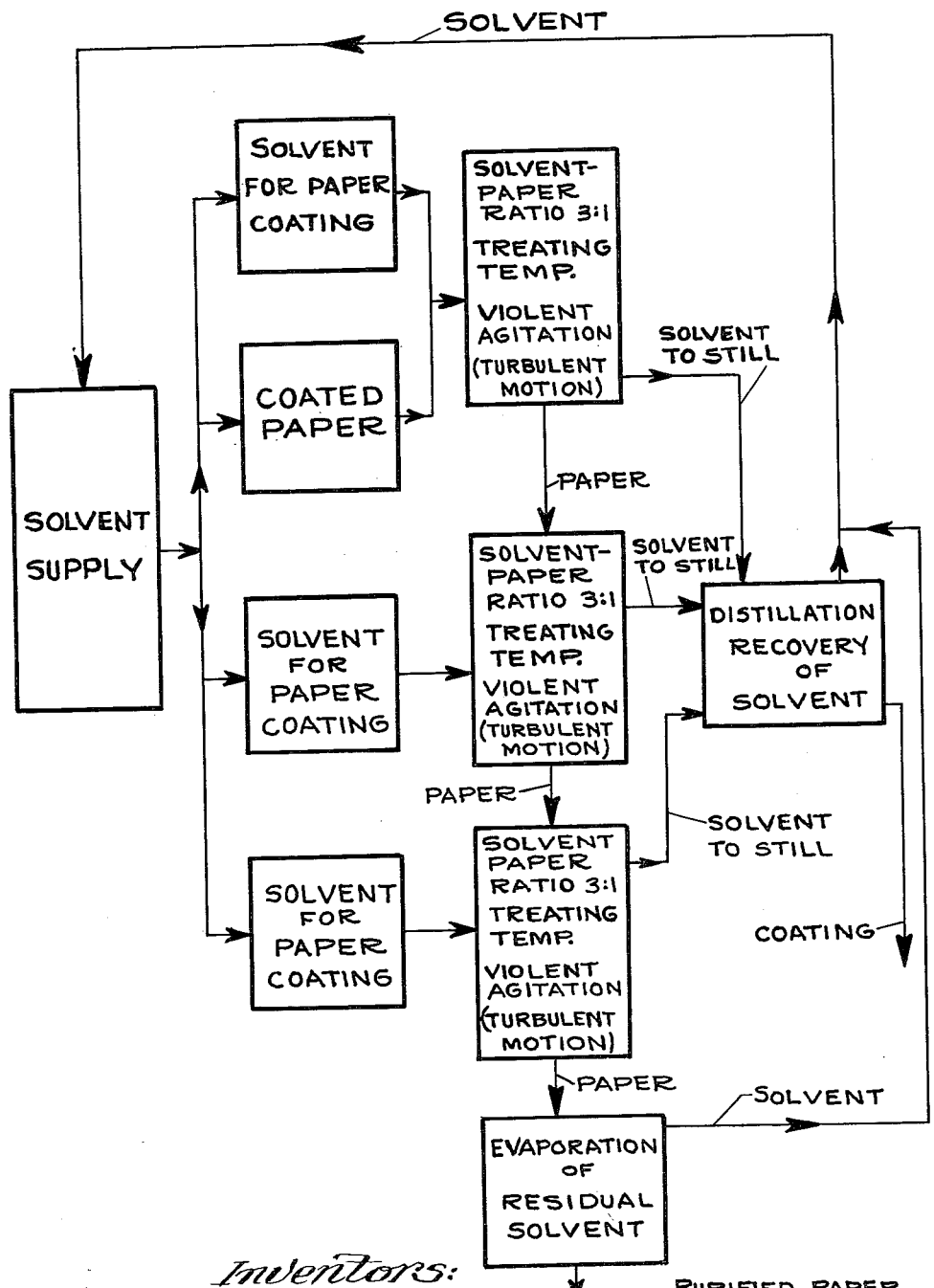

Patented Oct. 16, 1962

3,058,871
PULP RECOVERY PROCESS
Eugene F. Davis, Appleton, and Robert H. Lace, Combined Locks, Wis., assignors to Riverside Paper Corporation, Appleton, Wis., a corporation of Wisconsin
Filed Oct. 28, 1959, Ser. No. 849,183
4 Claims. (Cl. 162—5)

The present invention generally relates to the recovery of pulp, and more particularly relates to a process for the recovery of purified pulp from waste materials containing contaminants such as pastics, waxes, and the like.

The recovery of high quality purified pulp from sources including paper products in the form of broke, rejects, clippings, etc., which products contain solvent-soluble waxes and/or plastics as coatings or impregnants is highly desirable. This is true in view of the relatively high cost of the pulp from which the products are fabricated. For example, the pulp from which waxed and similiar paper products, such as bread wrappers, breakfast food boxes, moisture-resistant liners, paper containers for milk and frozen foods, etc., are fabricated is usually relatively expensive.

Various attempts have been made in the past to recover utilizable pulp from the above-described sources. However, it has been found that, in general, the waxes and plastics present on and in the described paper and paperboard products are difficult to effectively separate therefrom in an inexpensive manner and without deleteriously affecting the pulp. Aqueous extraction recovery techniques have been found to be generally inadequate for fine paper manufacture from the standpoint of the pulp yield, pulp purity and quality and, accordingly, the cost of the process.

Recovery processes employing organic solvents have also been relatively inefficient and expensive. For example, processes for counter-currently contacting of waste paper with organic solvents usually do not provide high quality pulps having low wax and plastic contents.

It will be understood that hereinafter the term "waste paper" relates to paper products, including paper and paperboard, boxboard and the like in any form suitable for recovery operations, i.e., whether unused clippings, rejects, etc., or whether used materials, and whether coated and/or impregnated with coating agents selected from the group consisting of waxes, plastics, and mixtures thereof.

The present invention comprises a simple inexpensive and efficient process for the recovery of high quality pulp from waste paper. Cleaner pulp is obtained in higher yield than heretofore, while avoiding the loss of valuable water-soluble constituents from the pulp. Hydrolysis and modification of the pulp characteristics are substantially prevented. So also is reduction of fiber strength. The coating agents are effectively removed to a controlled degree without excessive beating of the waste materials, so that fiber breakage is minimized.

Accordingly, the principal object of the present invention is to provide an improved process for the recovery of high quality paper pulp. A further object of the present invention is to provide an improved process for the recovery of high quality pulp from waste paper containing coating agents selected from a group consisting of waxes, plastics, and mixtures thereof. It is also an object of the present invention to provide purified pulp in high yield in a simple, inexpensive manner. Another object of the present invention is to provide a pulp substantially free of solvent-soluble coating agents and substantially retaining initial strength characteristics.

Further objects and advantages of the present invention will be apparent from a study of the following detailed description and of the accompanying drawings of which the single FIGURE is a schematic flow diagram illustrating one embodiment of the present invention.

In accordance with the present invention, waste paper containing the previously indicated coating agents is contacted in a batch operation with organic solvent under carefully controlled conditions of agitation and solvent concentration. Extraction is carried out in a series of stages utilizing successive batches of organic solvent. It has been found that the greatly increased efficiency of recovery of the pulp is to a large extent due to the combined effects of the controlled agitation of the solvent and waste paper, and the sequential contacting of the solvent with the waste paper, utilizing a specified proportion of solvent to waste paper.

Now referring more particularly to the present process, waste paper is purified of coating agent which may be a coating wax, coating plastic or a mixture thereof. In this connection, paraffin wax, microcrystalline wax or another type of coating wax commercially utilized may be present on the surface or impregnated within the waste paper. Natural and/or synthetic plastics may be present on or within the waste paper, for example, thermosetting plastics and thermoplastic materials. Polyvinyl chloride, polyvinyl acetate, polystyrene/butadiene copolymers, copolymers of polyvinyl acetate and polyvinyl chloride are common synthetic plastic coating agents for paper. Natural gums and resins, rubber compounds and similar constituents capable of being dissolved in organic solvents and having a plastic nature may be present in the waste paper. The coating agent is usually present in a concentration of up to about 30 percent or more, by weight.

In treating the waste paper, it usually is desirable to first carry out a shredding or baling operation, unless the waste paper is already in the form of relatively small pieces, for example, clippings, cuttings, etc. However, it should be understood that this preliminary step is optional.

The waste paper is then introduced into a treating zone equipped to effect a high degree of agitation during extraction.

The treating zone may comprise, for example, an open or shrouded tank, with or without baffles, deflector rings, etc., and may employ a rotary impeller, propeller, paddle, curved blade turbine etc. mounted on a revolving shaft. Alternatively, reciprocating paddles may be utilized, or the entire treating zone may comprise a revolving drum, with or without baffles, etc. Other comparable items of equipment commercially available and suitable for use in the extraction carried out in accordance with the present invention may be employed.

The solvent is one which is capable of dissolving the waxes and/or plastics of the coating agent present in or on the waste paper and which is compatible with the waste paper. It has been found that trichlorethylene is a preferred solvent in the present process. However, several other solvents are suitable for the purposes of the present invention. For example, other chlorinated hydrocarbons including tetrachlorethane, ethylene dichloride and pentachlorethane, are suitable solvents. Various fluorinated hydrocarbons may also be used, either singly or in compatible mixtures, as desired and as within the skill of those versed in the art. Such solvent is introduced simultaneously with or separately from the waste paper into the treating zone and in a controlled amount. The amount of solvent will of course somewhat depend upon the nature of the coating agent, the particular solvent selected, etc. In this connection, it has been found that trichlorethylene is a very efficient solvent for most waxes and plastics which may be utilized as the coating agent for high quality paper. Moreover, trichlorethylene is stable, colorless, non-inflammable, non-explosive and non-combustible. It will not attack common metals, even in the presence of moisture. Accordingly, it is safe and economical to use.

The waste paper is contacted in the treating zone with successive batches of the selected solvent, each contacting stage terminating with the removal of the respective batch of solvent. Such sequential contacting increases the rate of extraction and the extent of the extraction of the coating agent from the waste paper. The total amount of organic solvent utilized for the contacting throughout all the contacting stages will, as previously indicated, vary somewhat. In this connection, the total concentration will not only depend upon the solvent used and the particular coating agent, but will also depend upon the concentration of the coating agent and the manner of distribution on and within the waste paper, among other features.

The total amount of solvent will also somewhat depend upon treating temperature, prospective treating time, number of treating stages and the desired purity of the product. The solvent should be utilized in each contacting stage in relatively large concentrations with respect to the paper present. In this connection, for example, it is preferred to utilize a weight ratio of between about 3 and about 9 parts of solvent to 1 part of the waste paper, on a weight basis, in the event that three or four contacting stages are to be utilized and that the coating agent is present in a concentration of between about 3 and about 30 percent, by weight, as is usually the case. Where a batch, for example, of about 2500 pounds of coated waste paper containing about 15 percent by weight of paraffin wax coating is produced into the treating zone, a 2000 gallon (14,000 pound) quantity of trichlorethylene may be used in the initial contacting stage. Three subsequent contacting stages may, for example, be employed, preferably utilizing approximately equal or slightly greater amounts of solvent than the initial contacting stage. Thus, the initial contacting stage may, for example, be carried out utilizing between about 5 and about 6 pounds of solvent per pound of paper, and subsequent contacting stages may be carried out utilizing, for example, between about 6 and 7 pounds of solvent per pound of paper. The relative amounts of solvent and waste paper can, of course, be adjusted from contacting stage to contacting stage throughout the treating step, as conditions dictate. Generally, a sufficient amount of trichlorethylene or other solvent is utilized to purify the waste paper to a concentration of coating agent of not more than about 1 percent by weight, within a reasonable length of time.

The described treating step is carried out at a temperature below the boiling point of the solvent or the azeotropic mixture of solvent, and moisture present in the system. Preferably, the treating temperature is relatively low but still above room temperature, for example, for trichlorethylene, between about 110° F. and about 130° F., more preferably about 120° F. The treating zone may be heated, as by steam coils, etc. In addition, the solvent and/or waste paper may be preheated before entering the treating zone. The indicated treating temperature may be maintained substantially throughout the various treating stages of the treating step.

It has been found that in order to obtain the desired results it is necessary not only to sequentially contact the waste paper with the indicated large concentrations of solvent, but also to subject the mixture in the treating zone to violent agitation at the desired temperature. Such violent agitation may be carried out utilizing the previously described agitation equipment, that is, stirrers, paddles, etc. The agitation should be sufficiently vigorous or violent to establish and to maintain pronounced turbulence of the solvent throughout each treating or contacting stage. In this connection, the degree of agitation should be sufficiently great to maintain the solvent in motion and to keep the dissolved contaminants substantially uniformly distributed in the solvent.

During the treating step, the waxes, plastics, etc., of the coating agent are dissolved at a relatively rapid rate. In this connection, the required violent agitation is sufficiently large to assure intimate contact of relatively fresh solvent with the coating agent at substantially all times during the treating step. The solvent not only contacts the coating agent which may be present on the surface of the waste paper but also penetrates the paper and contacts the coating agent impregnated within the paper. The violent agitation has the effect of physically scrubbing the waste paper with the solvent, so as to speed and make more efficient and thorough the dissolving of the coating agent in the solvent. The large volume of solvent is in constant motion with the waste paper preferably maintained substantially suspended therein and contacted on all surfaces thereby. Movement of solvent and waste paper in cross directions in effect pumps the solvent against and into the waste paper for effective deep penetration of the solvent into the paper. Dissolution of the coating agent on an interfiber level occurs and is an important feature of the process of the present invention, insuring a uniformly high degree of purity in the pulp product.

The agitation of the solvent and waste paper during the treating step prevents the formation of a viscous film or layer of dissolved coating agent in the solvent adjacent the paper. Such layer containing a relatively static heavy concentration of dissolved coating agent acts in some commercial processes as a blanket or buffer preventing rapid dissolving of coating agents still present on or in the paper. Such layer formation is relatively common during certain countercurrent extraction processes and partially accounts for the slow and unsatisfactory extractions obtained in such processes.

Layering not only tends to block dissolution of the coating from the surfaces of the paper but also greatly decreases the rate of penetration of fresh or relatively fresh solvent into the paper. The usual high concentration gradient between the undissolved coating agent on or in the paper and the dissolved coating agent within the solvent is absent. Such gradient facilitates dissolution.

Accordingly, it is clear that violent agitation is essential in the present process to provide in a rapid manner a clean product with a minimum amount of effort and expense. It should be understood that the degree of violent agitation required for the process will necessarily somewhat vary depending upon the particular circumstances, and can be readily determined in accordance with the principles set forth herein.

The violent agitation of the solvent-paper mixture in the treating zone throughout each contacting stage is carried out, for example, for from 5 to about 15 minutes in the usual circumstances, after which the solvent may then be removed from the treating zone, as by draining or the like from the waste paper. A fresh batch of solvent may then be introduced into the treating zone and a subsequent stage initiated at the desired operating temperature and utilizing suitable violent agitation, as previously described. Additional contacting stages may follow. The conditions for each contacting stage may be essentially the same or somewhat different relative to solvent concentration, duration, temperature, etc. However, each contacting stage should employ violent agitation of the solvent-paper mixture. It has been found that the efficiency of extraction of the coating agent is substantially increased by the employment of the multi-stage contacting technique, in place of a single stage extraction. Furthermore, the multi-stage technique has the advantage of allowing for stripping of the solvent from a previous contacting stage while contacting of the paper is carried out during a subsequent contacting stage with a different batch of solvent. The solvent which is stripped of the coating agent and purified can then be recycled for reuse in the integrated process.

Upon completion of the entire treating step with its several contacting stages, at the end of which the coating agent in the waste paper has been reduced to the desired low level of, for example, about 1 percent or less by weight, the resulting purified pulp is then dried until substantially free of the solvent. The drying temperature is preferably at least that of the solvent, or of the azeotropic mixture of solvent and moisture obtained from the paper or surrounding environment.

The drying step may be carried out within the treating zone or within a separate drying zone and, preferably, under conditions which speed solvent removal. In this connection, currents of heated air may be passed over and/or through the purified pulp. Superheated steam may be substituted for the heated air in order to increase the efficiency of transfer of heat to the pulp and solvent while minimizing the introduction of moisture into the system. Agitation of the purified pulp may be employed to facilitate rapid drying. Other suitable drying means and aids may be employed.

Certain features of the present invention are illustrated in the following example:

*Example*

A 2500 pound batch of coated waste paper comprising a mixture of clippings and rejects of coated paperboard obtained during the fabrication of milk cartons, cereal cartons and the like and containing a total of about 160 pounds of coating agent including paraffin wax, microcrystalline wax, polyvinyl acetate and polyvinyl chloride is charged to a steam heated, cylindrical tank equipped with rotating paddles. Thereupon an 11,000 pound batch of trichlorethylene is introduced into contact with the paperboard in the tank. The temperature of the solvent and the paperboard mixture is adjusted to approximately 120° F. The mixture is then violently agitated by means of the paddles at a rate sufficient to maintain the trichlorethylene in constant motion and in a relatively turbulent state and the dissolved coating agent of the coated paperboards essentially suspended therein. The contacting stage of the treating step is maintained for about 11 minutes, with the temperature at about 120° F. and the described violent agitation being carried out. Thereafter, the trichlorethylene is withdrawn from the tank and passed to a distillation apparatus for purification, storage and recycling.

The described contacting stage is then repeated on the same batch of coated paperboard but utilizing three separate batches of fresh trichlorethylene under the same treating conditions, except that each batch contains 14,000 pounds of the trichlorethylene. At the end of each contacting stage the respective batch of trichlorethylene is withdrawn from contact with the paperboard and the next batch of fresh trichlorethylene is placed into contact with the paperboard. At the end of the last contacting stage, the trichlorethylene is drained from the tank.

Following the completion of the 4-stage treating step as described, the paperboard in the form of pulp remains in the tank and is heated therein to a temperature of approximately 161° F., that is approximately the boiling point of the trichlorethylene. This is accomplished by the addition of small amounts of superheated steam to the paperboard, and the indicated temperature is maintained for about 45 minutes until substantially all of the trichlorethylene has been evaporated from the paperboard.

The cleaned and dried paperboard is then removed from the treating tank, weighed and examined. The fiber loss during the treating process is calculated to be less than about 2.5 pounds. Substantially the remainder of the weight difference between the finished paperboard pulp and the paperboard first introduced into the treating tank comprises the coating agent which has been dissolved in the solvent and removed therewith. This coating agent is recovered from the solvent in a separate unit by stripping the solvent from the coating agent. Such solvent may be reused in another batch process in accordance with the present invention.

The recovered pulp is found to be clean in appearance and by analysis contains less than about 1 percent by weight of retained wax and plastic. Several portions of the pulp are examined for purity and found to be uniformly clean and free of the coating agent. No substantial accumulations or deposits of the coating agent are found either on or in the pulp. Moreover, tests indicate that the fiber strength of the pulp is substantially that of the treated paperboard. No separate bleaching, beating or washing independent of normal mill operatons are necessary before the pulp can be used in the production of high quality paper and paperboard products.

As set forth within the foregoing, the process of the present invention is a simple, economical and efficient way of recovering in high quantity purified pulp of high quality from waste paper containing wax and/or plastic coating agents. The purified pulp not only is clean but is also strong, and is produced at a relatively low cost. Further objects and advantages of the process of the present invention are as set forth in the foregoing.

Such modifications in the process of the present invention and in the steps, equipment and materials for carrying out the process, as are within the skill of the art are contemplated as being within the scope of the present invention.

What is claimed is the following:

1. A process for the recovery of high quality pulp from waste paper containing a coating agent, which process comprises treating the paper in a non-aqueous environment by the steps of sequentially batch contacting waste paper containing a coating agent selected from the group consisting of waxes, plastics, and mixtures thereof, in a treating zone with a plurality of treating the material which consists essentially of batches of organic solvent for said coating agent with the solvent of each batch in a concentration of at least about three parts per part of paper, and at treating temperature below the boiling point of the solvent and under conditions of violent agitation sufficient to maintain said solvent in turbulent motion and to maintain dissolved coating materials substantially uniformly distributed throughout said solvent, for a time sufficient to dissolve and remove said coating agent from said paper, separating said solvent from said paper and distilling residual solvent from said paper whereby purified paper pulp substantially free of treating material is provided, and recovering said coating agent from said separated solvent by distillation.

2. A process for the recovery of high quality pulp from waste paper containing a coating agent, which process comprises treating the paper in a non-aqueous environment by the steps of batch contacting paper coated with a coating agent selected from the group consisting of wax, plastics, and mixtures thereof, in a treating zone with a first batch of treating material which consists essentially of organic solvent for said coating agent at a treating temperature below the boiling point of the solvent and under conditions of violent agitation sufficient to maintain said solvent in turbulent motion and to maintain dissolved coating agent substantially uniformly distributed throughout said solvent, for a time sufficient to dissolve at least a substantial proportion of said coating agent from said paper, removing said first batch of solvent from said paper, successively contacting and treating said paper with subsequent batches of treating material which consists essentially of said solvent for said coating under said conditions and successively removing said subsequent batches of solvent from said paper, each of the batches of solvent being present in an amount of between about 3 and about 9 pounds per pound of paper, said contacting being carried out until said coating agent is substantially completely dissolved and removed from said paper, whereby an improved purified pulp free of treating material is provided, and recovering said coating agent from said removed batches of solvent by distillation of said solvent.

3. A process for the separate recovery of high quality pulp and coating agent from waste paper containing a coating agent, which process comprises treating the paper in a non-aqueous environment by the steps of batch contacting paper coated with a coating agent selected from the group consisting of wax, plastics, and mixtures thereof, in a treating zone with a first batch of treating material which consists essentially of organic solvent for said coating agent at treating temperature below the boiling point of the solvent and under conditions of violent agitation sufficient to maintain said solvent in turbulent motion and dissolved coating agent substantially uniformly distributed throughout said solvent for a time sufficient to dissolve and remove at least a substantial portion of said coating agent from said paper, removing said first batch of solvent from said paper, and successively contacting and treating said paper with subsequent batches of treating material which consists essentially of said solvent for said coating agent under said conditions and successively removing said subsequent batches of solvent from said paper, each of said batches of solvent being present in an amount of about between 3 and about 9 pounds per pound of paper, said contacting being carried out until said coating agent is substantially completely dissolved and removed from said paper, and thereafter substantially completely separating said solvent from residual paper by evaporating said solvent, whereby an improved paper pulp free of treating material and having increased purity and substantially unimpaired fiber strength is provided, and distilling said removed batches of solvent from said coating dissolved therein, whereby said solvent and coating are separately recovered for reuse.

4. A process for the separate recovery of high quality pulp and coating agent from waste paper containing a coating agent, said process comprising treating the paper in a non-aqueous environment by the steps of contacting a batch of paper coated with a coating agent selected from the group consisting of wax, plastics, and mixtures thereof, with a first batch of treating material which consists of liquid trichlorethylene at a treating temperature below the boiling point of said trichlorethylene, and in a concentration of from about 3 to about 9 pounds of trichlorethylene per pound of paper, under conditions of vigorous agitation sufficient to maintain said solvent in turbulent motion and to maintain dissolved coating agent substantially uniformly distributed throughout said solvent, for a time sufficient to dissolve and to remove at least a substantial proportion of said coating agent from said paper, removing said first batch of trichlorethylene from said paper, introducing a second batch of treating material which consists of fresh trichlorethylene into contact with said paper and treating said paper under conditions of vigorous agitation for a time sufficient to substantially remove a further portion of said coating agent from said paper, and continuing said treatment of said paper with subsequent batches of treating material which consists of trichlorethylene with vigorous agitation, followed by removal of said batches of trichlorethylene from said paper until the concentration of said coating agent in said paper is reduced to below about 1 percent by weight of said paper, said second and subsequent batches of trichlorethylene each being present in an amount of from about 3 to about 9 pounds per pound of paper, thereafter substantially completely separating residual trichlorethylene from said paper by evaporating said trichlorethylene upon the application of superheated steam thereto, whereby an improved purified paper pulp free of treating material is provided having substantially unimpaired fiber strength, and separately recovering said coating agent from said removed batches of trichlorethylene by distillation of said trichlorethylene.

References Cited in the file of this patent
UNITED STATES PATENTS

| | | |
|---|---|---|
| 1,990,376 | Hass | Feb. 5, 1935 |
| 2,703,754 | Myers | Mar. 8, 1955 |

OTHER REFERENCES

Hawley: The Recovery of Waste Roofing Felt, pub. in Paper Trade Journal, 1920, pp. 38 and 40.

UNITED STATES PATENT OFFICE

CERTIFICATE OF CORRECTION

Patent No. 3,058,871    October 16, 1962

Eugene F. Davis et al.

It is hereby certified that error appears in the above numbered patent requiring correction and that the said Letters Patent should read as corrected below.

Column 1, line 12, for "pastics" read -- plastics --; column 6, line 36, strike out "the"; column 7, line 29, for "said" read -- residual --; column 8, line 13, after "under" insert -- said --.

Signed and sealed this 24th day of September 1963.

(SEAL)
Attest:

ERNEST W. SWIDER
Attesting Officer

DAVID L. LADD
Commissioner of Patents